Patented Dec. 2, 1941

2,264,409

UNITED STATES PATENT OFFICE 2,264,409

ELECTRICAL INSULATION VARNISH

William F. Schaufelberger, Orange, N. J., assignor, by mesne assignments, to The Harvel Corporation, a corporation of New Jersey No Drawing. Application July 26, 1939, Serial No. 286,592

3 Claims. (Cl. 260—18)

The present invention relates to varnishes made from heat reaction products of alkyl ethers of cashew nut shell liquid and China-wood oil and a solid fusible mineral hydrocarbon.

The present application is a continuation in part of my co-pending application Ser. Number 130,100, filed March 10, 1937.

According to the present invention an alkyl ether of cashew nut shell liquid and China-wood oil are heated together at an elevated temperature to obtain a product which is heavier in viscosity than either the cashew nut shell liquid ether or the drying oil after which there is incorporated therein, by dissolving with the aid of heat, a solid fusible mineral hydrocarbon.

An object of the present invention is to obtain a varnished fabric which is soft in the sense that it is highly flexible and at the same time the varnish coating is strong and tough, has a high degree of resistance to solvents and has a long life of flexibility at temperatures higher than normal.

Varnished fabrics made with the varnish of the present invention are suitable for use in electrical insulation and particularly for wrapping cables for high voltage alternating currents because they have the above stated characteristics and because they also have high dielectric characteristics and low power factor characteristics.

The varnishes of the present invention are suitable also for making diaphragms for pumps for solvent liquids where resistance to solvents and good flexibility are required.

Illustrative examples of varnishes of the present invention are given as follows:

Example 1

About two hundred pounds of heat thickened ethyl ether of cashew nut shell liquid and about two hundred pounds of China-wood oils are heated together to about 525° F. and held between this temperature and 500° F. for one-half hour to get a body after which the body is cooled to about 350° F. and eighty pounds of paraffin wax added, after which the body is allowed to cool to 300° F. at which point about six pounds of lead Soligen driers are added. This varnish body is then thinned with about fifty gallons of a cut of petroleum spirits which is known by the trademark name of Varsol and is used generally as a varnish thinner.

Example 2

About two hundred pounds of heat thickened amyl ether of cashew nut shell liquid and about two hundred pounds of China-wood oil are heated to about 525° F. and held between 500° F. and 525° F. for about one-half hour to get a body with a definite string to it, after which there is added and stirred in, at the temperature stated above, the entire mass of a composition obtained by heating together about one hundred pounds of gilsonite and about sixteen pounds of heat thickened amyl ether of cashew nut shell liquid to between 550° F. and 600° F. until thoroughly dissolved together. This composition of gilsonite and amyl ether of cashew nut shell liquid is held at an elevated temperature until it is added to the cashew nut shell liquid ether-China-wood oil composition.

The batch is then allowed to cool and thinners (or solvents) and driers are added to the cool composition. An example of a drier is six pounds of lead Soligen drier and two pounds of manganese Soligen drier. The batch above described can be dissolved in seventy-five gallons of kerosene to make a varnish solution suitable for coating cambric in heated towers to obtain a varnished cambric suitable for wrapping electric cables.

Example 3

In another embodiment the method and materials of Example 2 were employed with the exception that asphalt pitch was used in the place of gilsonite. Asphalt pitch is a mineral hydrocarbon or bitumen which is softer than and less brittle than gilsonite.

In other modifications various combinations of paraffin, gilsonite and pitch can be used, that is any two of them or all three of them in various proportions can be used and substituted for the gilsonite of Example 2 above.

In the above examples the ratio of the amyl or other alkyl ether of cashew nut shell liquid to China-wood oil can be changed from that given, and can vary from a ratio of about three of amyl ether of cashew nut shell liquid to about one of the China-wood oil to about one of amyl ether of cashew nut shell liquid to about three of the China-wood oil.

Having thus described my invention, what I claim and desire to protect by Letters Patent is:

1. A varnish comprising essentially a heat reaction product of gilsonite, China-wood oil, and heat thickened alkyl ether of cashew nut shell liquid.

2. An electrical insulation composition comprising essentially a heat reaction product of gilsonite, China-wood oil, and a primary alkyl ether of cashew nut shell liquid, which ether has been thickened by heating.

3. An electrical insulation composition comprising a heat reaction product of gilsonite, a drying oil and a primary alkyl ether of cashew nut shell liquid, which ether has been thickened by heating.

WILLIAM F. SCHAUFELBERGER.